350-6.8 SR

XR 3,916,158

FT 3025D
TX 3058D

United States Patent

Sansone et al.

[11] 3,916,158

[45] Oct. 28, 1975

[54] OPTICAL SCANNER AND METHOD FOR PRODUCING A SCANNING PATTERN

[75] Inventors: Ronald P. Sansone, Floral Park, N.Y.; Alton B. Eckert, Jr., Norwalk, Conn.

[73] Assignee: Pitney-Bowes, Inc., Stamford, Conn.

[22] Filed: Jan. 21, 1974

[21] Appl. No.: 435,339

[52] U.S. Cl. .......... 235/61.11 E; 250/555; 250/568; 340/146.3 F

[51] Int. Cl.[2] .......... G06K 7/10; G06K 9/13

[58] Field of Search .......... 235/61.11 E, 61.11 D, 235/61.11 R; 250/568, 569, 570, 555, 556; 340/146.3 Z, 146.3 F

[56] References Cited

UNITED STATES PATENTS

| | | | |
|---|---|---|---|
| 3,553,437 | 1/1971 | Boothroyd | 235/61.11 E |
| 3,663,800 | 5/1972 | Myer | 235/61.11 E |
| 3,676,645 | 7/1972 | Fickenscher | 235/61.11 E |
| 3,728,677 | 4/1973 | Munson | 340/146.3 F |
| 3,818,444 | 6/1974 | Connell | 340/146.3 F |

*Primary Examiner*—Daryl W. Cook
*Assistant Examiner*—Robert M. Kilgore
*Attorney, Agent, or Firm*—William D. Soltow, Jr.; Albert W. Scribner; Peter Vrahotes

[57] ABSTRACT

Apparatus for producing a scan pattern for the omni-directional reading of bar code indicia. The scan pattern defines two sets of diagonal lines, the first set of lines intersecting the second set at an angle of approximately 90°, and means is provided for imparting translational movement of the pattern. This translational optical scanning pattern insures readability of a bar code bearing indicia regardless of the angle at which the indicia is conveyed past the reader.

14 Claims, 10 Drawing Figures

OPTICAL SCANNER AND METHOD FOR PRODUCING A SCANNING PATTERN

BACKGROUND OF THE INVENTION

Many systems have been proposed in the point-of-sales field for the obtaining of information from data coded indicia, such as tags, labels, tickets and the like having a bar code printed thereon. Most recently, the grocery industry has adopted a uniform product code (UPC) which is in the form of a bar code. Systems using a hand-held wand are capable of readily reading such a bar code and thereby present no problem as the operator may pass the wand over the bar code along the length of the indicia. Where a stationary reader is employed, however, certain assurances must be made that the bar code will be read no matter what angle the indicia may assume.

Various schemes have been proposed in the past for patterns which assure reading of a bar code regardless of the angle of the indicia. One of these is an X-scan pattern wherein moving traces continually define an X pattern within a given field. This X-scan pattern is normally set up by a mechanical means and the reading of this information from the X-scan pattern has proven to be somewhat cumbersome to the operator. The main disadvantage of such prior X-scan patterns is that the X pattern is stationary, i.e., the X remains in one position within the field and reliance of selective movement is placed solely on the articles bearing the indicia. Additionally, the X-scan patterns provide a square configuration which requires an extended reach by an operator when he wishes to lift an item from the conveyor at the extreme lateral edge of the conveying path. A system is herein disclosed which improves the original X-scan pattern by providing translational movement to the X-scan pattern and by presenting a rectangular read field while insuring reading reliance by permitting a minimum path to be traversed.

SUMMARY OF THE INVENTION

This invention concerns a translational X-scan pattern for the omni-directional reading of bar code bearing indicia, such as a UPC bearing indicia, which are to be read at a point-of-sales location. The scan pattern is generated by three basic mechanical displacements of two spots of light. These linear displacements may be generated by rotating multifaceted mirrors or by electrically driven optical scanners.

In a preferred embodiment, the scan pattern consists of a mesh of crossed scans that move relatively slowly across a rectangular scan window. One of the mechanical displacements of one spot of light is in the form of a sine curve. The mechanical displacement of the second spot of light is also in the form of a sine curve, but out of phase 90° to give the effect of a cosine relative to the first spot. The third mechanical displacement is longitudinal and operates on both the sine curve spot and the cosine curve spot so that the resulting pattern is a plurality of displacing scans with half of them at a right angle displacement relative to the other half.

BRIEF DESCRIPTION OF THE DRAWING

FIG. 3 including FIGS. *3a* through *3f*, is a rendering of the basic motion of the pattern components indicating the vectors which go to make up the scan pattern.

DESCRIPTION OF THE PREFERRED EMBODIMENTS

Figures 1, 2:
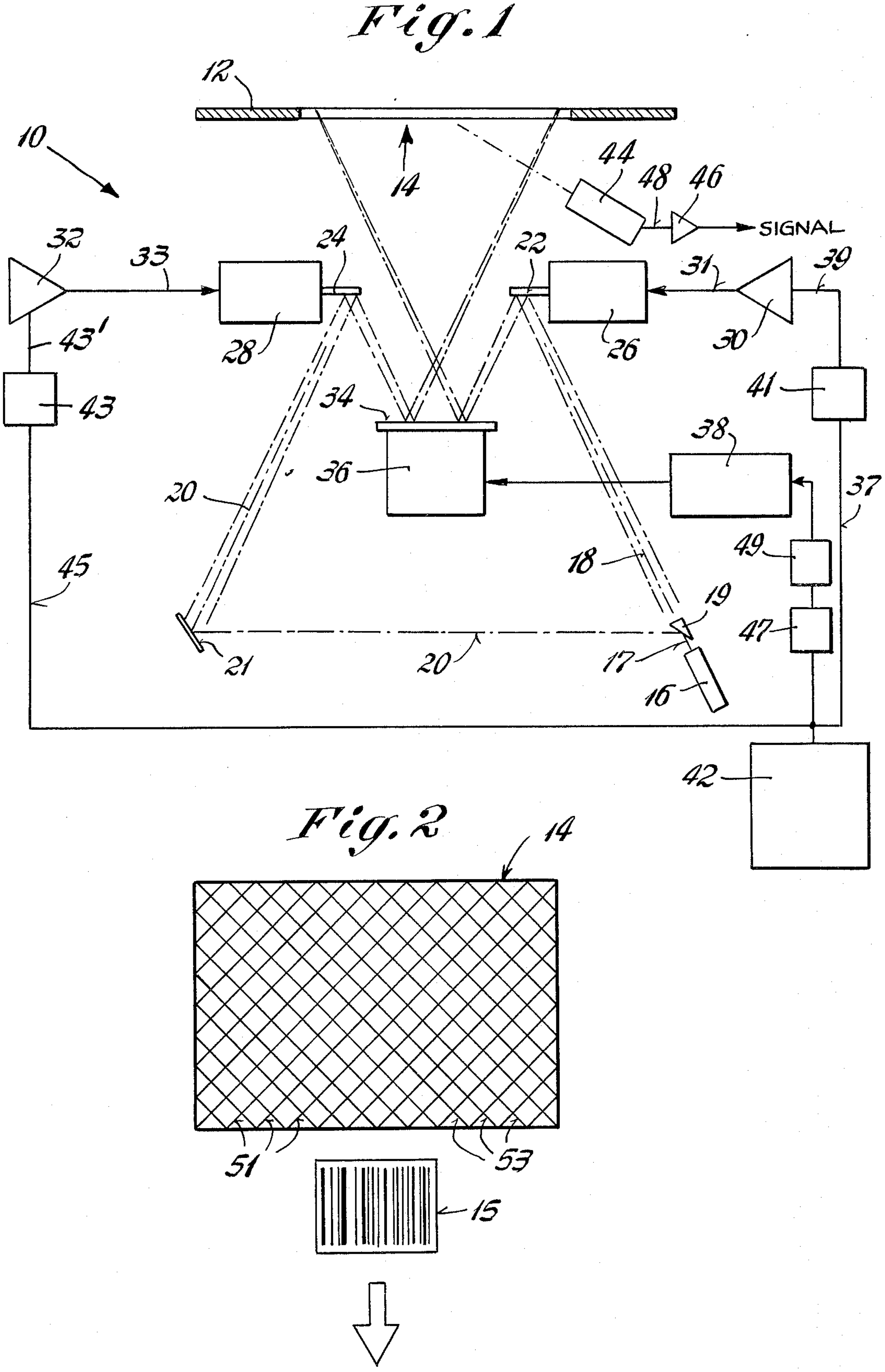
FIG. 1 is a diagrammatic view of apparatus which incorporates the features of this invention.
FIG. 2 is a plan view of the scan pattern generated by the apparatus shown in FIG. 1.

Referring now to FIG. 1 of the drawing, a scanning system for the reading of bar codes is shown generally at 10. The system 10 is located below a counter 12 of a checkout stand which has a reading area, in the form of a window 14, therein over which an article having a bar code bearing indicia 15 is conveyed generally in a direction as shown in FIG. 2. A laser 16 generates a beam 17 which is split into a pair of light beams 18 and 20 by a beam splitter 19. One of the split beams 20 is reflected by a mirror 21. Each of the light beams 18 and 20 is directed to a mirror 22 and 24, respectively. The first mirror 22 is operatively engaged with a ramp generator or scanner 26 that is electrically connected to an amplifier 30 by a lead 31. In a like manner, mirror 24 is operatively engaged with a ramp generator or scanner 28 which is electrically connected to an amplifier 32 by a lead 33. Scanners of this type are fairly well known commercially and are readily available, as for example, optical scanner type L44 manufactured by the Electronics Division of the Bulova Watch Company.

Each of the beams 18 and 20 is directed in a superimposed relationship to a third mirror 34 which is secured to a scanner 36, i.e. the beams are directed to the same area of the third mirror though they may not appear simultaneously in the window 14. The scanner 36 is driven with a translatory motion by a ramp generator 38. The motion of the scanner 36 is such that there is a vector of translation along the bisector of the angle between beams 18 and 20, thereby forming a scan format which is longer than it is high.

The basic timing for the scanning system is provided by a sine wave oscillator 42 which generates a sine wave signal. An RC shift network 41 receives a signal from the sine wave oscillator 42 through a lead 37 and transmits the signal to the amplifier 30 through a lead 39 after a minus 45° phase change. A second RC phase shift network 43 receives a signal from the sine wave oscillator 42 through a lead 45 and transmits the signal to the amplifier 32 through a lead 43¹ after a positive 45° phase change. The result of these two phase changes is to provide a 90° phase relationship between the inputs to the two mirror drive amplifiers 30, 32. With this arrangement, the beam 20 will be reflected onto mirror 34 to define a cosine curve relative to reflected beam 18.

The ramp generator 38 may be free running at a frequency several times slower than the sine wave oscillator 42. The ratio of these frequencies determines the number of strokes per frame in the viewing window 14. In the case of a free running ramp generator 38, no fixed pattern is generated. A fixed pattern, if desired, may be generated by synchronizing the ramp generator 38 to the sine wave oscillator 42. One means for accomplishing this is to produce a sync pulse from a synchronizing circuit 49 to restart the ramp generator 38 each time a counter 47 repeats. The modulus of the counter 47 determines the number of strokes in the fixed pattern traced in the window 14.

A photocell 44 is situated in a location such that it is able to receive the reflections of light beams 18 and 20. An amplifier 46 is in contact with the photocell 44 through a lead 48 and a signal is sent to appropriate logic and reader systems (not shown).

Figures 3A, 3B, 3C, 3D, 3E, 3F, 4:
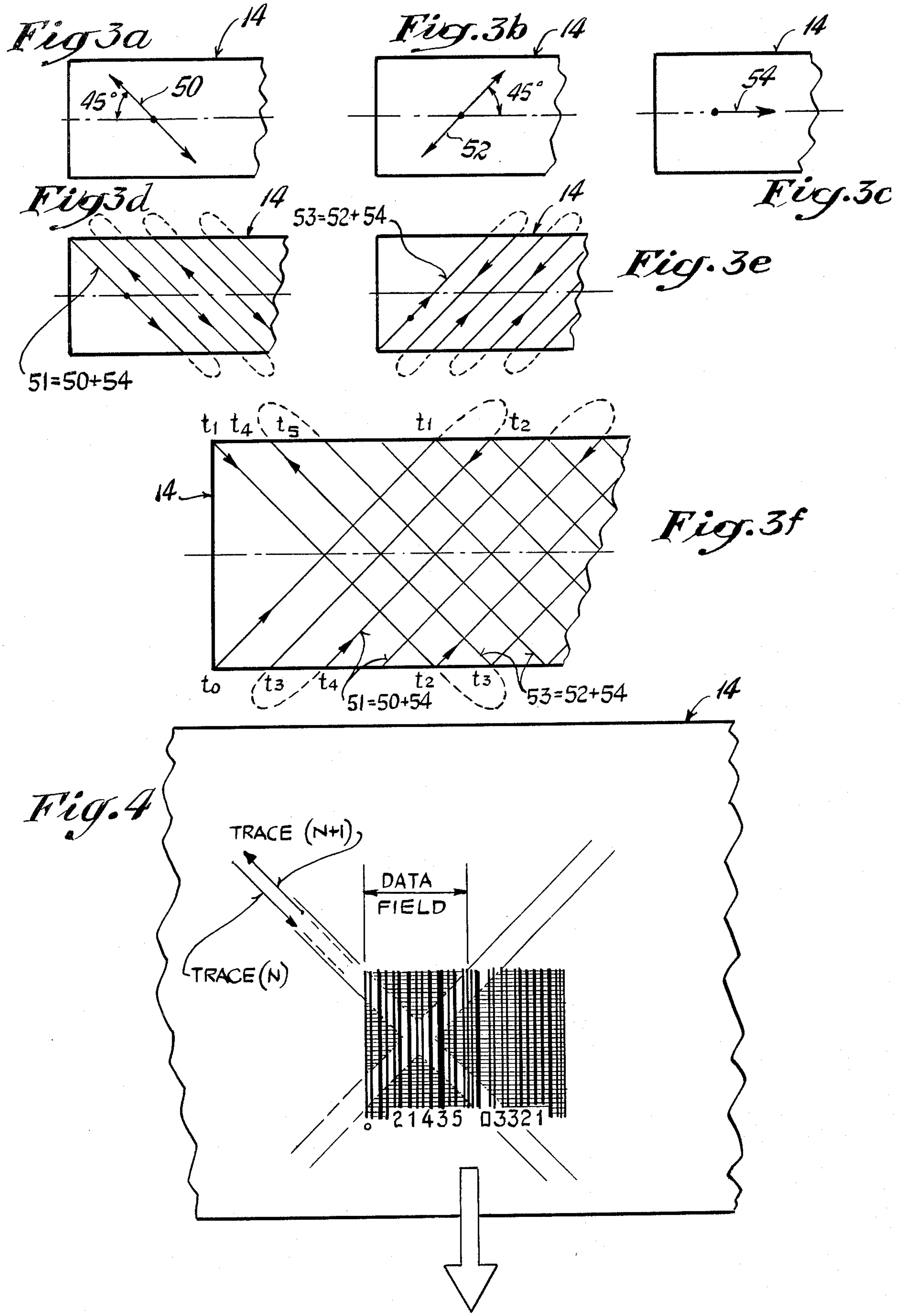
FIG. 4 is a plan view of a bar code bearing indicia showing optical scans intercepting the bar code.

Referring now to FIG. 3, the components which make up the X-scan pattern are illustrated. In FIG. 3*a* the X-scan pattern component due to mirror 22 is shown as it is directed up through the window 14 and is shown as a trace 50. It will be noted that the angle of the trace 50 is 45° relative to the longitude of the window 14. Similarly, mirror 22 directs a like trace 52 only displaced 90° from trace 50. As indicated previously, scan mirror 34 causes a longitudinal displacement which is shown in FIG. 3c as a trace 54. FIG. 3d shows the resultant trace 51 of the two traces 50, 54 which results from the motions of ramp generator 26 and scanner 36. FIG. 3e shows the resultant trace 53 of the two traces 52, 54 as a result of the translatory motion due to ramp generator 28 and scanner 36. It will be noted that only a portion of the traces 51, 53 are viewable from the window 14 and portions of these traces, that is, the curved portion of the sine and cosine curves, are outside the view of the window. This is accomplished by giving the traces 51, 53 an amplitude greater than the width of the window 14. Consequently, the traces 51, 53 give the indication of creating a plurality of nearly straight spaced lines at approximately a 45° angle from the longitude as a result of the squared, or chopped, pattern which falls across the window 14.

FIG. 3*f* shows the overall result achieved. At *t*0, the starting time of the operation, the trace 51 is just coming into view of the counter window 14 as is shown in the lower left hand corner in FIG. 3f. At *t*1, the trace 51 leaves the view of the window 14 as trace 53 is just entering the view in the upper left hand corner of the FIG. 3f. At *t*2 the trace 53 is just leaving the view on the lower edge as the trace 51 is just re-emerging into view, as can be seen at the upper edge of FIG. 3*f*. In this way, the traces 51, 53 which are at substantially right angles to one another alternately appear in the window 14. It will be noted that the curved portions of each of the resultant scans 51, 53 are outside the window 14 area, i.e. a squared pattern is produced from the chopped sine and cosine curves. It will be appreciated that the various resultant traces 51, 53 will not form exact straight lines in the window 14 area, but the X-scan pattern formed thereby is shown as straight lines for reasons of clarity and convenience.

The design of a scan system 10 of the instant invention yields reliable results each time a code bearing indicia is passed through a scan pattern and will account for the following parameters: field data length, indicia dimensions, and object velocity (maximum and minimum). Using the above parameters, it is possible to compute the scan field depth (top to bottom) which will insure one full cycle of scans to cover the indicia at maximum velocity, and the number of scans per cycle required to insure at least one scan falling in the read window 14 of the indicia. The latter can be visualized as the pitch by which consecutive parallel scans are stepped. This is shown in FIG. 4 which shows a difficult case indicia orientation. The scan pitch is shown as less than the read window because of indicia displacement due to its movement between scan N and N+1, where N is any given scan in a sequence. The distance travelled by the indicia during the time between scan N and N+1 must be subtracted from the read window to provide a scan pitch which insures a full data field being scanned. The scan pattern width is determined by the specific method used to feed the scanner. For example, in the case of a supermarket checkout stand, the width is determined by the location of the operator, his reach, and the size of objects being scanned. It will be noted in FIG. 4 that only half of the indicia is being shown as covered by the scans N and N+1. With many contemporary code bars, including the UPC, it is necessary only to read the code bar one half at a time as the same includes a center mark indicia which indicates that one half of the code bar has been read and proper logic may be established for interpreting the complete bar code through half indicia readings as is known in the art.

Figure 5:
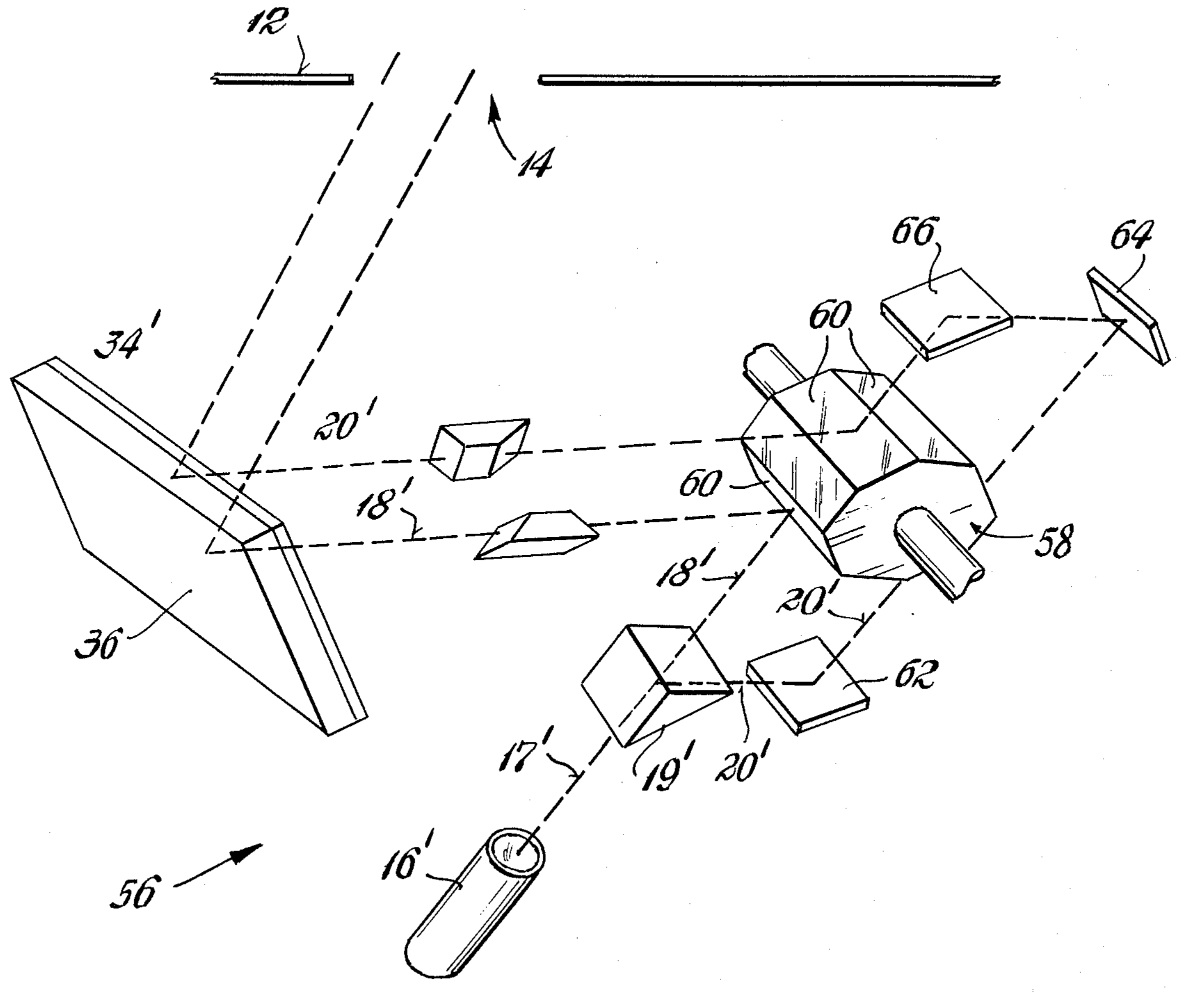
FIG. 5 is a diagramatic view of alternate apparatus which incorporates the features of this invention.

In FIG. 5 there is shown an alternate scanning system, generally indicated at 56, which incorporates a rotating multifaceted mirror and provides certain design economics over the scanning system of FIG. 1. Specifically, the scanning system 56 utilizes a drum scanner 58 having a polygonal surface periphery in which each flat surface segment 60 arrayed around the periphery is mirrored. The laser 16' output beam 17', as in the embodiment of FIG. 1, is split into two beams 18' and 20' by a beam splitter 19'. Split beam 18' impinges on one mirrored surface segment 60, while the other split beam 20' is directed by a series of mirrors 62, 64 and 66 for impingement on a different mirrored surface segment. The positions of the mirrors 62, 64 and 66 are established such that the sweeps of the two split beams are relatively out of phase.

Each of the beams is directed to a mirror 34' which is secured to and driven by a scanner 36' that has translatory motion which tends to impart longitudinal movement to the beams 18' and 20' relative to the window 14. Referring to FIG. 2, when the scan 51 produced by each sweep of split beam 18' is moving through its field of view limited by the window 14, the trace 53 produced by each sweep of split beam 20' is beyond its field of view limited by the window and vice versa. Thus, a translational X-scan pattern is generated by the embodiment of FIG. 5 as a pair of alternating, mutually perpendicular traces 51, 53 in the general pattern as produced in the previously described embodiment.

It will be appreciated that the traces 51, 53 can be derived from separate scanning or sweep generating elements synchronized to each other. Moreover, rather than dividing a main light beam into split beams, separate beam sources may be utilized.

What is claimed is:

1. An apparatus for forming a translational X-scan pattern for the reading of indicia having a bar code thereon, the combination comprising:

a. means for generating a pair of light beams;
b. a reflective surface spaced relative to the indicia;
c. first and second light directing means;
d. means for driving said first and second directing means with a geometric motion;
e. said first directing means directing one of said beams onto said reflecting surface in a manner to trace a sine curve;
f. second directing means directing the other said beams onto said reflective surface in a manner to trace a cosine curve relative to said first trace; and g. means for deflecting said reflective surface.

2. The apparatus of claim 1 wherein said first and second directing means are ramp generators.

3. The apparatus of claim 1 wherein said second directing means directs the other of said beams onto said reflective surface to form a trace in a superimposed relationship with the trace formed by said first beam.

4. The apparatus of claim 1 wherein said light beams are laser generated beams.

5. An apparatus for forming a translational X-scan pattern for the reading of indicia having a bar code thereon, the combination comprising:

a. a reflective member spaced generally parallel to the indicia;

b. means for providing translational movement to said reflective member;

c. first and second scanners having reflective surfaces associated therewith;

d. means for generating a pair of sine wave signals and directing one to each of said reflective surfaces;

e. means for changing the phases of said sine wave signals 90° relative to one another before they are received by said reflective surfaces;

f. means for generating a pair of light beams, one light beam being directed to each of said reflective surfaces; and g. said first reflective surface directing one of said light beams onto said reflective member to trace a sine curve and said second reflective surface directing the other of said light beams onto said reflective member to trace a cosine curve relative to said first trace, said traces being superimposed to one another.

6. Apparatus for reading bar code indicia placed in a reading area, comprising;

a. means for generating a pair of laser beams which are in movement approximately 90° relative to one another;

b. a reflective member spaced relative and with a reflective surface generally parallel to the reading area;

c. means for directing the first of said laser beams upon said reflective member to define a trace;

d. means for directing the second laser beam upon said reflective surface to define a second trace superimposed upon and oriented approximately 90° relative to said first trace; and e. means for imparting oscillatory translational movement to said reflective member relative to the surface of the reading area thereby producing a movement of said traces across the reading area.

7. An apparatus for forming a translational X-scan pattern for the reading of indicia having a bar code thereon, which indicia is conveyed over the window of a counter, the combination comprising:

a. a reflective surface spaced relative to the window;

b. means for imparting translational motion to said surface;

c. a laser beam source;

d. a beam splitter spaced relative to said source for dividing the output beam into a pair of split beams;

e. first and second ramp generators each having a mirror secured thereto, said mirrors being angularly spaced relative to said reflective surface;

f. the mirror of said first ramp generator being aligned to angularly receive a first split beam;

g. a reflecting member positioned to receive the second split beam and directing it to the mirror of said ramp generator, whereby a pair of conveying beams are directed onto said reflective surface, and hence toward the window;

h. a sine wave oscillator operatively connected to each of said ramp generators to impart a sine wave motion to said first and second beams reflected from said mirrors; and i. means for shifting the phase of at least one sine wave motion to achieve a phase change of approximately 90° between said mirrors, thereby causing said beams to produce a pair of traces directed across the window having sine and cosine curves relative to one another.

8. The apparatus of claim 7 including means for synchronizing said translational motion means with said ramp generators.

9. The apparatus of claim 7 wherein the amplitude of the scans are larger than the width of the window so that only a portion of the scans from the mirrors are directed to the window to produce a squared pattern.

10. The apparatus of claim 7 wherein the approximately 90° phase shift is accomplished by a phase shift network operatively disposed intermediate said sine wave oscillator and said first ramp generator to change the phase of the signal to said first ramp generator a positive 45° and a second phase shift network operatively disposed intermediate said sine wave oscillator and said second ramp generator to change the phase of the signal to said second ramp generator by a negative 45°.

11. An apparatus for forming a translational X-scan pattern for the reading of indicia having a bar code thereon, which indicia is conveyed over the window of a counter, the combination comprising:

a. a reflective surface spaced relative to the window;

b. means for imparting translational motion to said surface;

c. a laser beam source;

d. a beam splitter for dividing the output beam into a pair of split beams;

e. a rotating scanning element having a plurality of mirrored surface segments around its periphery, said element being spaced relative to said reflective surface and operative to deflect said split beams into sweeps in time phased relationship to each other upon the reflective surface; and f. means for optically rotating the direction of sweep of at least one of said split beams so as to produce an orthogonal relationship therebetween, thereby to generate the X-scan pattern on said reflective surface.

12. A method for forming a translational X-scan pattern for reading a bar code indicia located on an object which is moved across a reading area by producing an X-scan pattern consisting of two sets of scans, each set being generally diagonal to the direction of movement of the object and the lines of one set intersecting the lines of second set at approximately 90°, the steps comprising:

a. creating a pair of light beams;

b. imparting a sine wave to one of said light beams;

c. imparting a cosine wave to the second of said light beams;

d. superimposing said light beams upon a reflective surface;

e. providing translational movement to the reflective surface; and f. directing the light beams from the reflective surface to the reading area to create a pair of traces which define a translational X-scan pattern therein.

13. The method of claim 12 including imparting an amplitude to the scans which is larger than the width of the reading area so that only a portion of the scans appear in the reading area to produce a squared pattern.

14. A method for forming a translational X-scan pattern for reading a bar code indicia located on an object which is moved across a reading area by producing an X-scan pattern consisting of two sets of scans, each set being generally diagonal to the direction of movement of the object and the lines of one set intersecting the lines of second set at approximately 90°, the steps comprising:

a. creating a pair of laser beams;

b. directing the laser beams into sweeps in time phased relationship to each other;

c. producing an X-scan pattern by rotating the direction of the sweeps of at least one of the laser beams to produce an orthogonal relationship therebetween;

d. directing the X-scan pattern to a reflecting surface;

e. imparting translational motion to the reflective surface; and f. directing the X-scan pattern from the reflective surface to the reading area.

* * * * *